(12) United States Patent
Cho et al.

(10) Patent No.: US 9,738,275 B2
(45) Date of Patent: Aug. 22, 2017

(54) DRIVING CONTROL METHOD FOR HYBRID TYPE VEHICLES WITH DUAL CLUTCH TRANSMISSION

(71) Applicant: Hyundai Motor Company, Seoul (KR)

(72) Inventors: Sung Hyun Cho, Yongin-si (KR); Ho Young Lee, Bucheon-si (KR); So Young Lee, Seoul (KR); Seung Sam Baek, Suwon-si (KR); Ho Sung Kim, Anyang-si (KR); Seong Hwan Cheong, Hwaseong-si (KR); Young Min Yoon, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/092,315

(22) Filed: Apr. 6, 2016

(65) Prior Publication Data

US 2017/0158190 A1 Jun. 8, 2017

(30) Foreign Application Priority Data

Dec. 4, 2015 (KR) ........................ 10-2015-0172734

(51) Int. Cl.
*B60W 10/02* (2006.01)
*B60W 20/50* (2016.01)
(Continued)

(52) U.S. Cl.
CPC ............ *B60W 20/50* (2013.01); *B60W 10/02* (2013.01); *B60W 10/08* (2013.01);
(Continued)

(58) Field of Classification Search
CPC .... B60W 20/50; B60W 10/02; B60W 10/113; B60W 20/40; B60W 10/18; B60W 2510/0208; B60W 2710/021; B60W 2710/1005; B60W 2710/027; B60W 2510/081; B60W 2710/081; B60K 6/46;
(Continued)

(56) References Cited

U.S. PATENT DOCUMENTS

2010/0292881 A1* 11/2010 Takahashi .............. B60K 6/365
701/22
2011/0125356 A1* 5/2011 Takahashi .............. B60K 6/387
701/22
(Continued)

FOREIGN PATENT DOCUMENTS

JP 2010-025273 A 2/2010
JP 2011-031695 A 2/2011
(Continued)

*Primary Examiner* — David J Hlavka
(74) *Attorney, Agent, or Firm* — Brinks Gilson & Lione

(57) ABSTRACT

The present disclosure provides a driving control method for hybrid type vehicles with a DCT. The method includes: receiving the motor speed from a driving motor; when abnormality of the motor speed is detected, requesting driving of an engine and determining whether an engine clutch is engaged; if it is determined that the engine clutch is released, controlling a clutch of a current driving stage using a clutch torque higher than a transmission input torque; controlling the current driving stage to be a limp home driving stage set in advance to be in a limp home driven status.

8 Claims, 3 Drawing Sheets

(51) Int. Cl.
*B60W 10/113* (2012.01)
*B60W 20/40* (2016.01)
*B60W 10/08* (2006.01)
*F16H 3/00* (2006.01)
*B60K 6/547* (2007.10)
*B60K 6/46* (2007.10)
*F16D 48/06* (2006.01)

(52) U.S. Cl.
CPC .......... *B60W 10/113* (2013.01); *B60W 20/40* (2013.01); *B60K 6/46* (2013.01); *B60K 6/547* (2013.01); *B60W 2510/0208* (2013.01); *B60W 2510/081* (2013.01); *B60W 2710/021* (2013.01); *B60W 2710/027* (2013.01); *B60W 2710/081* (2013.01); *B60W 2710/1005* (2013.01); *B60Y 2200/92* (2013.01); *B60Y 2300/42* (2013.01); *B60Y 2300/60* (2013.01); *B60Y 2300/70* (2013.01); *F16D 48/06* (2013.01); *F16D 2500/102* (2013.01); *F16D 2500/108* (2013.01); *F16D 2500/10412* (2013.01); *F16D 2500/304* (2013.01); *F16H 3/006* (2013.01); *Y10S 903/919* (2013.01); *Y10S 903/93* (2013.01)

(58) Field of Classification Search
CPC ... B60K 6/547; F16H 3/006; F16D 2500/304; F16D 48/06; F16D 2500/10412; F16D 2500/102; F16D 2500/108
See application file for complete search history.

(56) References Cited

U.S. PATENT DOCUMENTS

| | | | |
|---|---|---|---|
| 2011/0276213 A1* | 11/2011 | Tomatsuri | B60K 6/365 701/22 |
| 2015/0321664 A1* | 11/2015 | Bae | B60W 10/08 701/22 |
| 2016/0146272 A1* | 5/2016 | Choi | F16D 48/06 701/67 |

FOREIGN PATENT DOCUMENTS

| | | |
|---|---|---|
| JP | 2015-033904 A | 2/2015 |
| KR | 10-2008-0018579 A | 2/2008 |
| KR | 10-2012-0060068 | 6/2012 |
| KR | 10-2012-0061391 | 6/2012 |
| KR | 10-2013-0007844 | 1/2013 |

\* cited by examiner

DRIVING CONTROL METHOD FOR HYBRID TYPE VEHICLES WITH DUAL CLUTCH TRANSMISSION

CROSS REFERENCE TO RELATED APPLICATION

The present application claims priority to Korean Patent Application No. 10-2015-0172734, filed on Dec. 4, 2015, which is incorporated by reference in its entirety.

FIELD

The present disclosure relates to a driving control method for hybrid type vehicles with a dual clutch transmission (DCT).

BACKGROUND

The statements in this section merely provide background information related to the present disclosure and may not constitute prior art.

Vehicles with a DCT transfer an engine torque to a transmission by selectively controlling two dry clutches. The dry clutch may easily generate heat due to a clutch slip and heated heat sources are slowly cooled by convection based on an air cooling method.

However, when a clutch is controlled to continuously bring about the clutch slip even under the condition that the dry clutch continuously generates heat, the dry clutch reaches an area in which a friction characteristic of a friction surface of the dry clutch is lost and finally loses the friction characteristic of the clutch, such that clutch hardware may fail.

In determining the slip which is an important factor of the heat generation of the clutch, hybrid type vehicles with the DCT determine the slip by comparing a speed detected from an input shaft speed sensor installed in the transmission with a motor speed input from a driving motor. Therefore, the two speed signals are used as an input signal in protecting the clutch.

Therefore, when the motor speed input from the driving motor is inaccurate, the clutch slip may not be accurately determined. Therefore, even when the abnormality of the motor speed is detected, overheating of the clutch is unavoidable.

SUMMARY

The present disclosure provides a driving control method for hybrid type vehicles with a dual clutch transmission (DCT) capable of driving vehicles while protecting a driving system even when abnormality of a motor speed is detected.

According to an exemplary embodiment of the present disclosure, there is provided a driving control method for a hybrid type vehicle with a DCT, including: a motor speed receiving step of receiving a motor speed from a driving motor; an engine clutch determining step of requesting driving of an engine and determining whether an engine clutch is engaged, when abnormality of the motor speed is detected; a full lock control step of controlling a clutch of a current driving stage using a clutch torque having a predetermined safety factor higher than that of a transmission input torque, if it is determined that the engine clutch is released; and after the full lock control step, a limp home control step of controlling the current driving stage to be a limp home driving stage to be limp-home-driven.

The limp home control step may include: a driving stage determining step of determining whether the current driving stage matches the limp home driving stage; a limp home driving step of driving the vehicle to be in a limp home driving status when the current driving stage matches the limp home driving stage; and after the limp home driving step, performing the engine clutch determining step so as to determine whether the engine clutch is engaged.

In the limp home driving step, the clutch speed of the current driving stage which is in the limp home driving status may be replaced by the motor speed to receive the motor speed.

The limp home control step may include: a driving stage determining step of determining whether the current driving stage matches the limp home driving stage; a shifting step of shifting the current driving stage to the limp home driving stage to match the current driving stage with the limp home driving stage, when the current driving stage does not match the limp home driving stage; and after the shifting step, determining whether the engine clutch is engaged by the engine clutch determining step.

In the shifting step, the current driving stage may be shifted to a targeted driving stage higher or lower by a 1 stage toward the limp home driving stage, and the shifting may be performed by a drive to drive control applying a clutch torque of the targeted driving stage to immediately switch a clutch of the targeted driving stage from a released state to the full lock state while releasing the clutch torque of the current driving stage to immediately switch the clutch of the current driving stage from the full lock state to the released state.

The clutch speed of the current driving stage which is shifted and driven by the shifting step may be replaced by the motor speed and thus the motor speed may be received.

The driving control method may further include: as a determination result in the engine clutch determining step, if it is determined that the engine clutch is engaged, a normal driving control step of normally controlling the driving of the vehicle by replacing the engine speed by the motor speed A controller may receive the motor speed of the driving motor to determine whether the abnormality of the motor speed is detected and the controller may control a clutch actuator to apply or release a clutch torque to and from the clutch.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
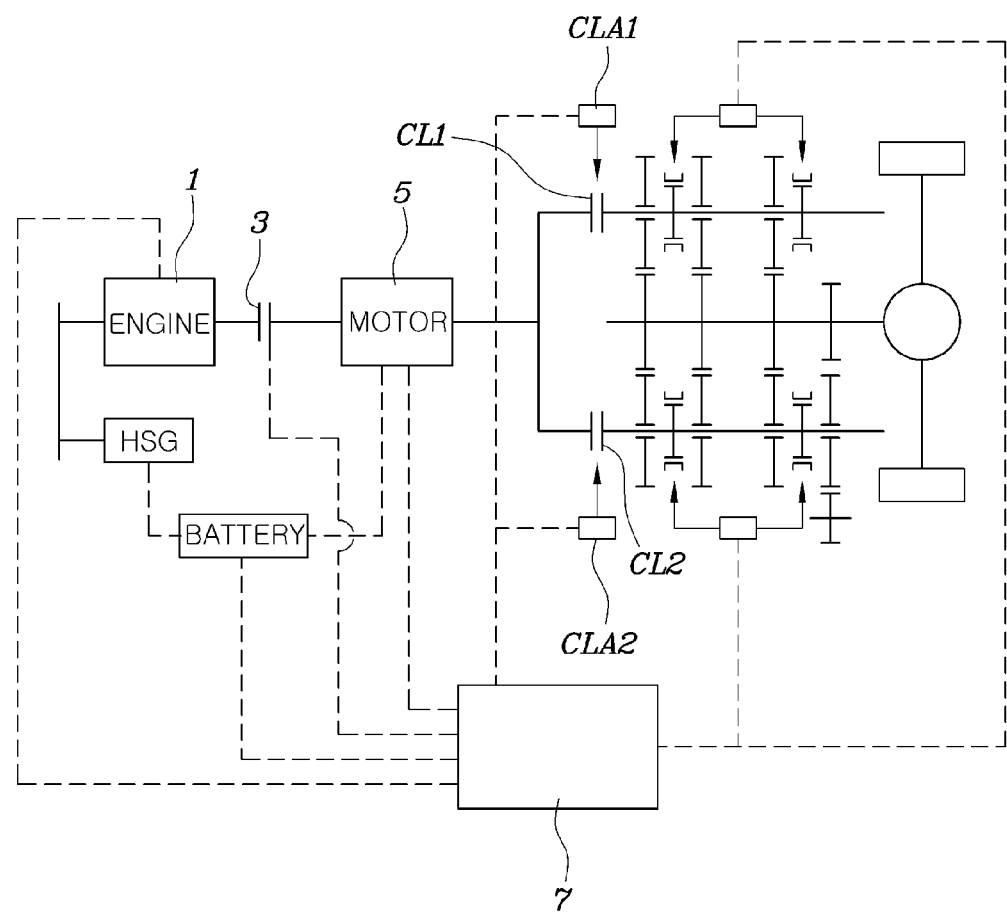
FIG. 1 is a diagram illustrating a configuration of a hybrid type vehicle with a DCT.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A driving control method for a hybrid type vehicle with a DCT according to an exemplary embodiment of the present disclosure may be configured to largely include a motor speed receiving step, an engine clutch determining step, a limp home control step, and a first driving control step.

Figure 2:
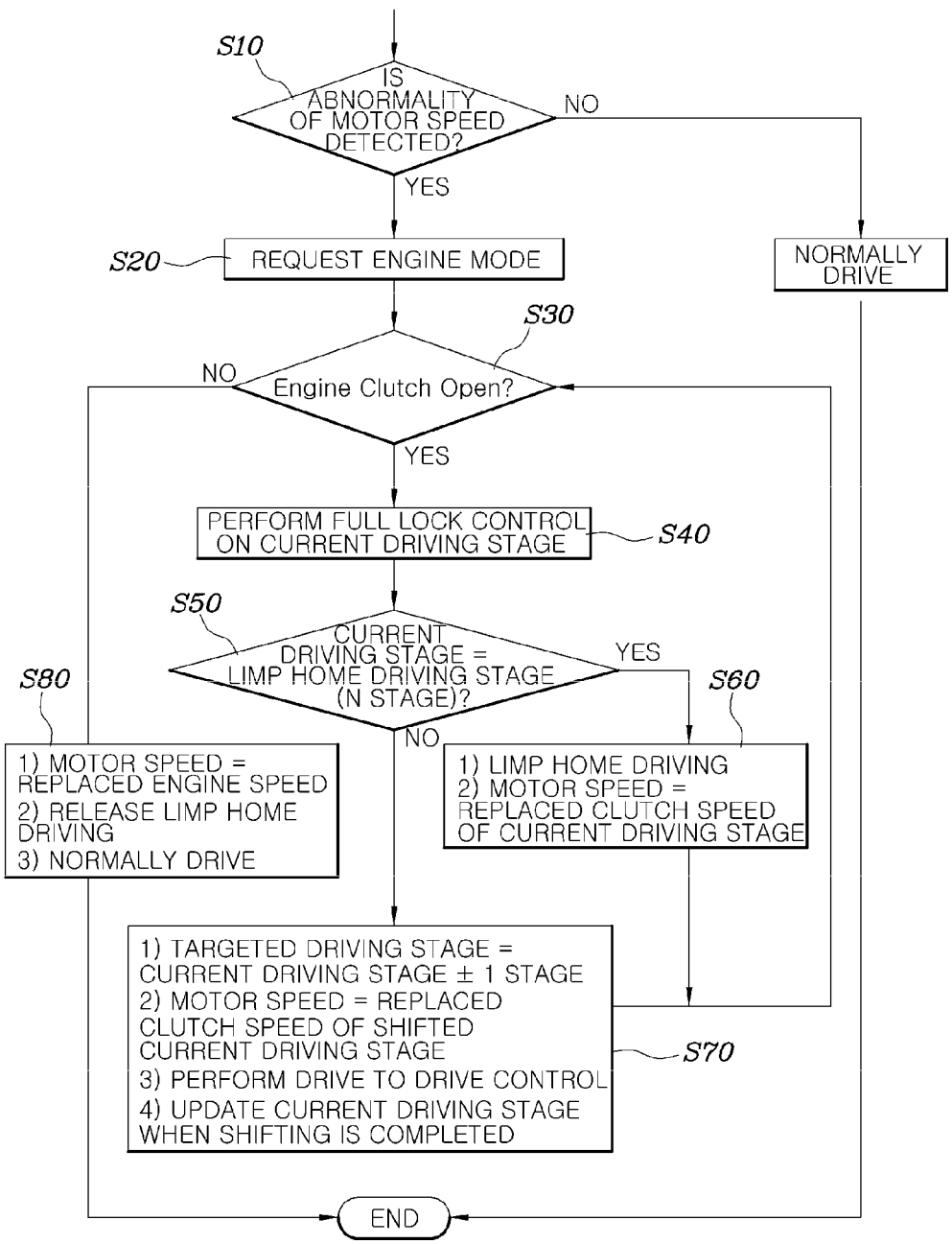
FIG. 2 is a diagram for describing a driving control flow for the hybrid type vehicle with a DCT.

Describing in detail the present disclosure with reference to FIGS. 1 and 2, first of all, in the motor speed receiving step, a motor speed may be received from a driving motor 5.

For example, a signal generated by a rotation of the driving motor 5 is input to a controller 7 and thus the controller 7 may calculate the motor speed.

In the engine clutch determining step, when abnormality of the motor speed is detected, driving of the engine 1 may be requested and it may be determined whether the engine clutch 3 is engaged.

That is, when the abnormality of the motor speed is detected by the controller 7, the driving of the engine 1 is requested to transfer a driving force of the engine 1 to a transmission and then it is determined whether the engine clutch 3 is engaged.

In a full lock control step, as a determination result in the engine clutch determining step, if it is determined that the engine clutch 3 is released, a clutch of a current driving stage is controlled using a clutch torque higher than a transmission input torque by a predetermined safety margin.

For example, the transmission input torque is inputted from the driving motor 5 and the additional clutch torque corresponding to the predetermined safety margin is applied a clutch CL2 via a clutch actuator CLA2 so that applying the clutch torque higher than the transmission input torque to the clutch CL2 of the current driving stage is performed. The clutch CL2 of the current driving stage may be fully engaged and thus a slip generated from the clutch CL2 of the current driving stage is removed.

In this case, the reason of removing the slip is that when the clutch slip occurs, heat may be generated from a friction surface of the clutch and thus a clutch slip amount may not accurately be figured out in a state in which the motor speed may not accurately be figured out and a clutch temperature may not also be measured. Therefore, if the clutch slips without recognizing the overheating condition of the clutch, the clutch overheats and finally is damaged. To inhibit or prevent the overheating condition of the clutch, a slip of the clutch CL2 of the driving stage should be considered.

Here, the clutch CL2 of the driving stage is a clutch engaged to transfer a torque to the transmission among two clutches (first clutch and second clutch) and may be a driving shaft clutch installed at an input shaft as a driving shaft, in which each clutch is engaged and released by a clutch actuator and the clutch actuator may control a clutch torque by determining a stroke moving amount using the controller 7.

For example, in the case of a vehicle with a DCT in which 1, 3, 5, and 7 stages which are an odd driving stage are formed by a first clutch CL1 and 2, 4, 6, and R stages which are an even driving stage are formed by a second clutch CL2, when the current driving stage is a 4 stage, the second clutch CL2 becomes a driving shaft clutch and the first clutch CL1 becomes a non-driving shaft clutch. Further, to separately operate the first clutch CL1 and the second clutch CL2, a first clutch actuator CLA1 and a second clutch actuator CLA2 may each be provided.

Next, in the limp home control step, after the full lock control, it is possible to control the current driving stage to be a limp home driving stage (N stage). Here, a shift gear pair corresponding to the limp home driving stage may be set in advance.

For example, a plurality of shift gear pairs having different gear ratios are provided within the transmission and when a 4 stage gear pair among the shift gear pairs has a 1:1 gear ratio, the limp home driving stage may be set to be the 4 stage driving stage formed by the 4 stage gear pair.

That is, according to the above-mentioned configuration, in the driving condition in which abnormality of the speed of the driving motor 5 is detected and the engine clutch 3 is not engaged, the current driving stage is performed by the limp home driving stage which may maintain a 1:1 gear ratio, along with the full lock control of the clutch CL2 of the current driving stage.

Therefore, by driving a vehicle while maintaining the limp home driving stage in the state in which the clutch slip is limited, it is possible to control a vehicle to be stably driven while inhibiting or preventing the clutch from being damaged due to the overheating of the clutch.

Referring to FIG. 2, the limp home control step may include a driving stage determining step and a limp home driving step.

First, in the driving stage determining step, it may be determined whether the current driving stage matches the limp home driving stage set in advance.

Further, in the limp home driving step, when the current driving stage matches the limp home driving stage, the current driving stage is determined as the limp home driving stage to control a vehicle to be in the limp home driving status.

In this case, the clutch speed of the current driving stage which is the limp home driving status is replaced by the motor speed and thus the motor speed may be received. In this case, the clutch speed may be measured by input shaft speed sensors installed at two clutches.

That is, when the limp home driving stage is a 4 stage and the current driving stage is a 4 stage which is the limp home driving stage, the clutch speed forming the 4 stage driving stage may be replaced by the motor speed. Therefore, it is possible to drive a vehicle while controlling the vehicle based on the motor speed.

Further, after the limp home driving step, it may be again determined whether the engine clutch 3 is engaged by entering the engine clutch determining step. The control method after the engine clutch 3 is engaged will be again described below.

Further, the limp home control step may be configured to again include a driving stage determining stage and a shifting step.

First, in the driving stage determining step, it may be determined whether the current driving stage matches the limp home driving stage.

Further, in the shifting step, when the current driving stage does not match the limp home driving stage, the current driving stage may be shifted to the limp home driving stage to match the current driving stage with the limp home driving stage.

For example, in the shifting step, the current driving stage is shifted to a targeted driving stage higher or lower by a 1 stage toward the limp home driving stage.

That is, when the current driving stage is a three stage and the limp home driving stage is a 4 stage, the shifting is performed while the targeted driving stage is set to be the 4 stage. Further, when the shifting is completed, the current driving stage may be updated to the shifted driving stage.

Figure 3:
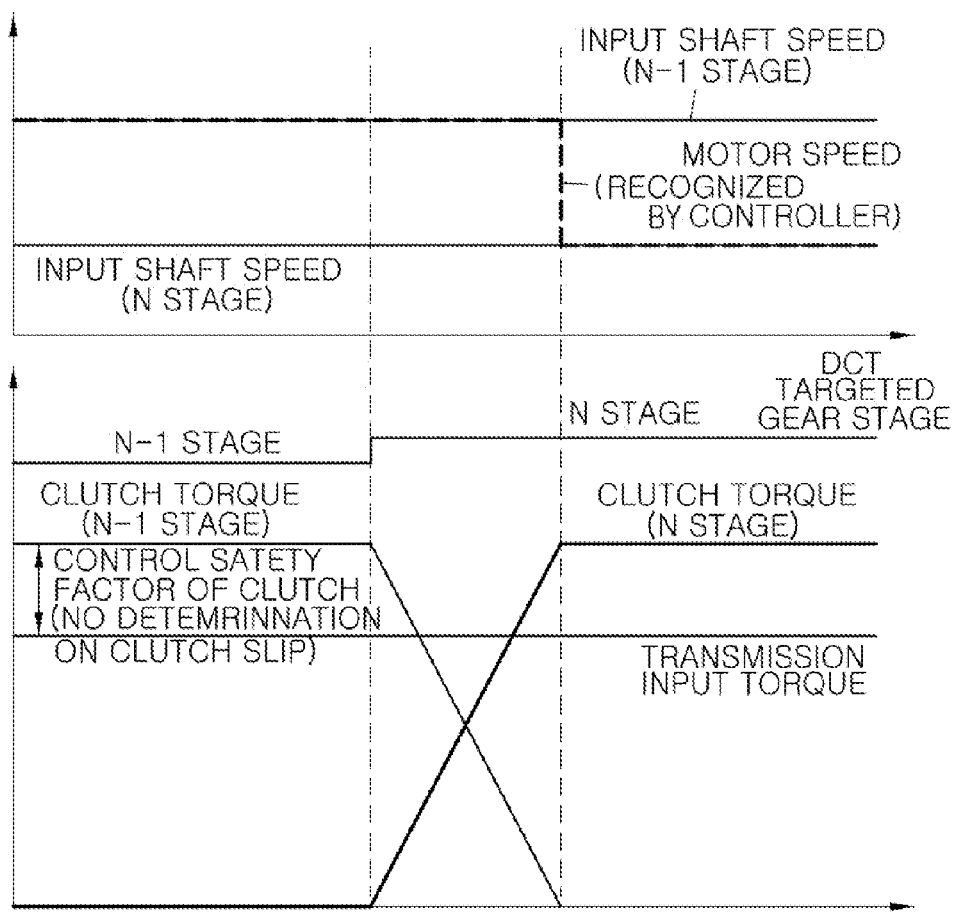
FIG. 3 is a diagram for describing a behavior of an engine and a clutch upon a driving control.

In this case, as illustrated in FIG. 3, for the clutch control of the current driving stage and the targeted driving stage, the shifting may be performed by a drive to drive control which controls the clutch torque of the current driving stage to be released so as to immediately switch the clutch of the current driving stage from the full lock state to the completely released state, and at the same time, controls the clutch torque of the targeted driving stage to be applied so as to immediately switch the clutch of the targeted driving stage from the completely released state to the full lock state.

That is, unlike the existing shifting control process, the engine rotating speed control (inertia phase control) depending on the clutch slip is not performed and the clutch CL2 of the current driving stage and the clutch CL1 of the targeted driving stage are switched by being simultaneously crossed to the full lock state and the completely released state to remove the occurrence factors of the clutch slip, thereby driving a vehicle while inhibiting or preventing the clutch from being damaged due to the overheating of the clutch.

Further, the clutch speed of the current driving stage which is shifted and driven by the shifting step is replaced by the motor speed and thus the motor speed may be received.

For example, when the driving stage which is shifted by the shifting step is the 4 stage, the clutch speed forming the 4 stage driving stage may be replaced by the motor speed. Therefore, it is possible to drive a vehicle while controlling the vehicle based on the motor speed.

Further, after the shifting step, it may be again determined whether the engine clutch 3 is engaged by entering the engine clutch determining step.

As the determination result in the engine clutch determining step, if it is determined that the engine clutch 3 is engaged, the method of the present disclosure may be configured to further include a normal driving control step of normally controlling the driving of the vehicle by replacing the engine speed by the motor speed.

That is, even when the abnormality of the motor speed is detected, the engine speed may be replaced by the motor speed under the driving condition in which the engine clutch 3 is engaged, thereby replacing the function of the motor speed. Therefore, when the above-mentioned limp home driving is performed, the limp home driving may be released and the shifting may be normally performed to drive the vehicle.

Hereinafter, a driving control flow according to the exemplary embodiment of the present disclosure will be described.

Referring to FIG. 2, it is determined whether the abnormality of the motor speed of the driving motor 5 is detected (S10) and as the determination result, if it is determined that the abnormality of the motor speed is detected, the engine driving is requested (S20).

Next, it is determined that the engine clutch 3 is in an open or close state (S30) and as the determination result, if it is determined that the engine clutch 3 is in an open state, the clutch CL2 of the current driving stage is subjected to the full lock control (S40).

Further, it is determined whether the current driving stage which is subjected to the full lock control is the limp home driving stage (S50).

As the determination result, if it is determined that the current driving stage is the limp home driving stage, after a vehicle is controlled to be in a limp home driving status (S60), the method again enters step S30. In this case, the clutch speed of the limp home driving stage which is currently being driven may be replaced by the motor speed to control the driving of the vehicle.

On the other hand, when the current driving stage is not the limp home driving stage, the current shifting stage is subjected to the shifting control to be the limp home driving stage (S70), and then the method again enters step S30. In this case, the shifted current shifting stage clutch and targeted shifting stage clutch are shifted by the drive to drive control crossing the clutch torque to the full state and the completely released state at a time.

Further, after the step S20 or the steps S60 and S70, as the determination result on the state of the engine clutch 3, if it is determined that the engine clutch 3 is engaged, the engine speed is replaced by the motor speed to normally drive a vehicle (S80).

As described above, the present disclosure replaces the engine speed by the motor speed under the condition that the engine clutch 3 is engaged to control the vehicle to be normally shifted and driven, when the abnormality of the motor speed is detected and maintains the limp home driving stage while reducing the clutch slip even under the condition that the engine clutch 3 is not engaged to control the vehicle to be driven.

Therefore, it is possible to secure the durability of the DCT by controlling the clutch slip amount to be smallest upon the abnormality of the motor speed and improve the marketability by making the control strategy to drive a vehicle.

According to the exemplary embodiments of the present disclosure, it is possible to secure the durability of the DCT by controlling the clutch slip amount to be smallest upon the abnormality of the motor speed and improve the marketability by making the control strategy to drive a vehicle without damaging the engine and the transmission.

Meanwhile, although specific examples of the present disclosure have been described above in detail, it is obvious to those skilled in the art that various modifications and alterations may be made without departing from the spirit and scope of the present disclosure.

What is claimed is:

1. A driving control method for a hybrid type vehicle with a dual clutch transmission (DCT), comprising:
    a motor speed receiving step of receiving a motor speed from a driving motor;
    an engine clutch determining step of requesting driving of an engine and determining whether an engine clutch is engaged, when abnormality of the motor speed is detected;
    a full lock control step of controlling a clutch of a current driving stage using a clutch torque higher than a transmission input torque by a predetermined safety margin, when the engine clutch is released; and
    after the full lock control step, a limp home control step of controlling the current driving stage to be a limp home driving stage set in advance.

2. The driving control method of claim 1, wherein the limp home control step includes:
    a driving stage determining step of determining whether the current driving stage matches the limp home driving stage; and
    a limp home driving step of driving the vehicle to be in a limp home driving status when the current driving stage matches the limp home driving stage, and after the limp home driving step, performing the engine clutch determining step so as to determine whether the engine clutch is engaged.

3. The driving control method of claim 2, wherein in the limp home driving step, a clutch speed of the current driving stage which is in the limp home driving status is replaced by the motor speed to receive the motor speed.

4. The driving control method of claim 1, wherein the limp home control step includes:
- a driving stage determining step of determining whether the current driving stage matches the limp home driving stage; and
- a shifting step of shifting the current driving stage to the limp home driving stage to match the current driving stage with the limp home driving stage, when the current driving stage does not match the limp home driving stage, and
- after the shifting step, determining whether the engine clutch is engaged by the engine clutch determining step.

5. The driving control method of claim 4, wherein in the shifting step, the current driving stage is shifted to a targeted driving stage higher or lower by a 1 stage toward the limp home driving stage, and the shifting is performed by a drive to drive control applying a clutch torque of the targeted driving stage to immediately switch a clutch of the targeted driving stage from a released state to a full lock state while releasing the clutch torque of the current driving stage to immediately switch the clutch of the current driving stage from the full lock state to the released state.

6. The driving control method of claim 5, wherein the clutch speed of the current driving stage which is shifted and driven by the shifting step is replaced by the motor speed and thus the motor speed is received.

7. The driving control method of claim 1, further comprising:
- as a determination result in the engine clutch determining step, when the engine clutch is engaged, a normal driving control step of normally controlling a driving of the vehicle by replacing an engine speed by the motor speed.

8. The driving control method of claim 1, wherein a controller is configured to receive the motor speed of the driving motor and configured to determine whether the abnormality of the motor speed is detected and
the controller is configured to control a clutch actuator to apply or release a clutch torque to and from the clutch.

* * * * *